2,403,738

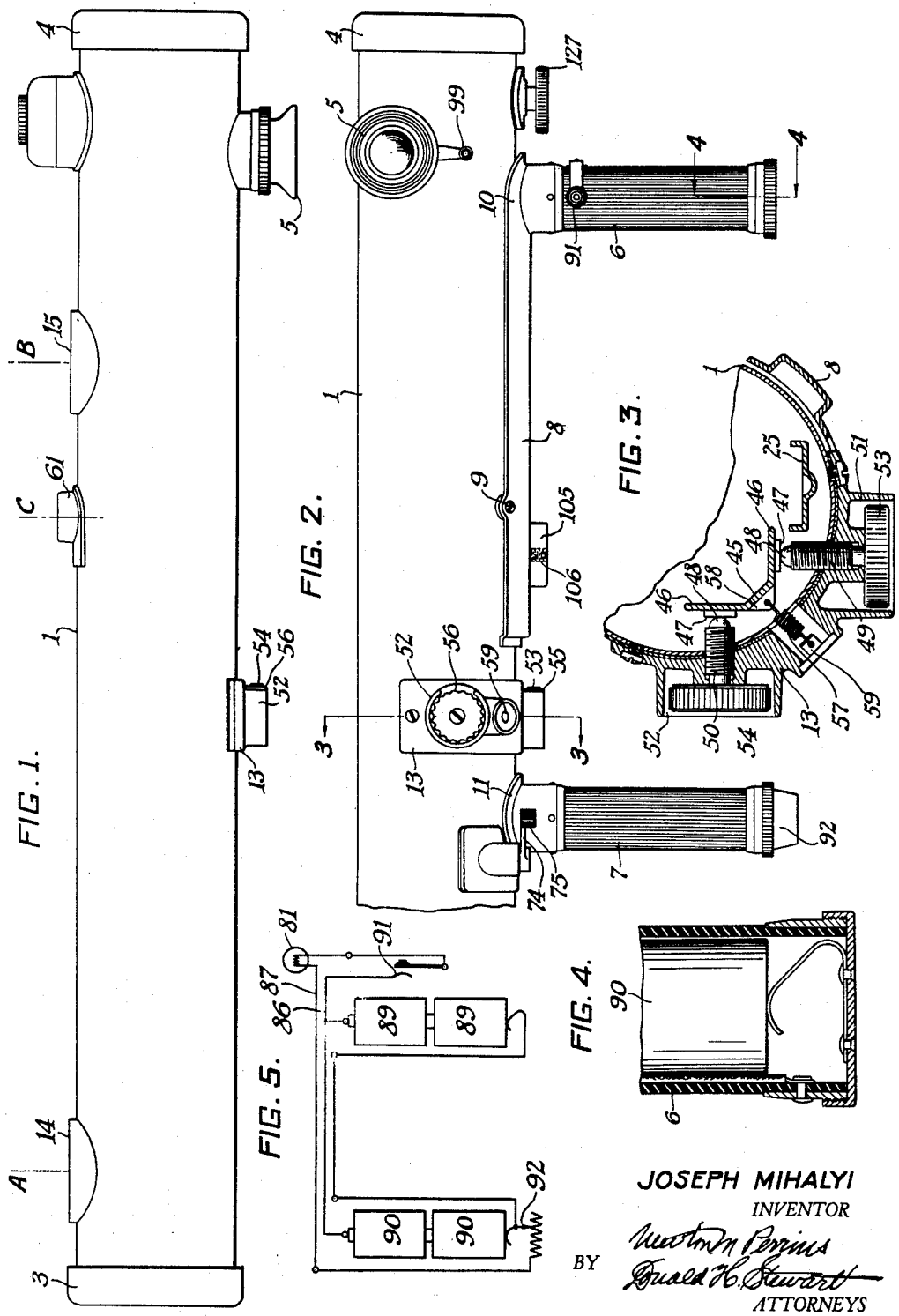
July 9, 1946.  J. MIHALYI  2,403,738
RANGE FINDER CONSTRUCTION
Filed Oct. 10, 1942  3 Sheets-Sheet 1
JOSEPH MIHALYI
INVENTOR
ATTORNEYS July 9, 1946.  J. MIHALYI  2,403,738
RANGE FINDER CONSTRUCTION
Filed Oct. 10, 1942  3 Sheets-Sheet 2
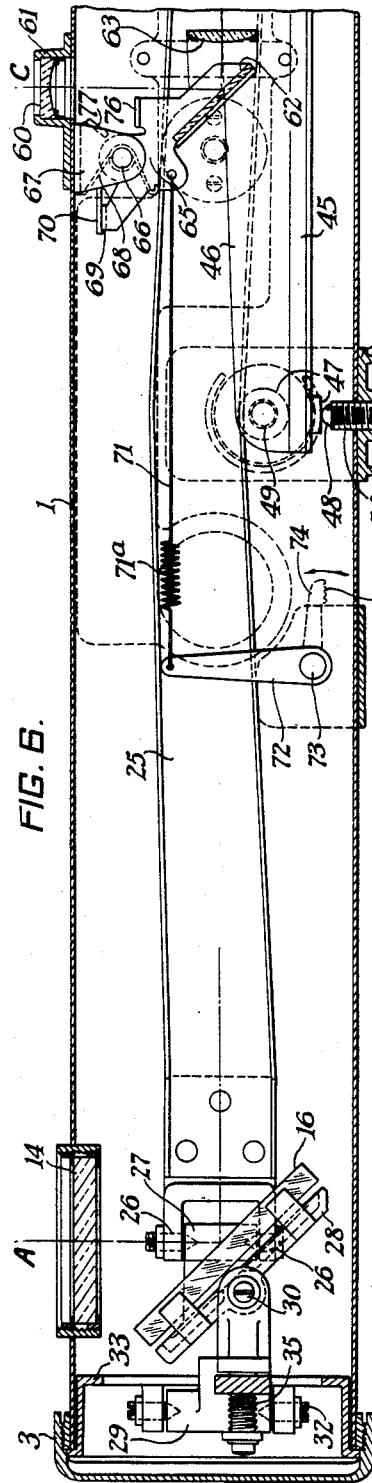
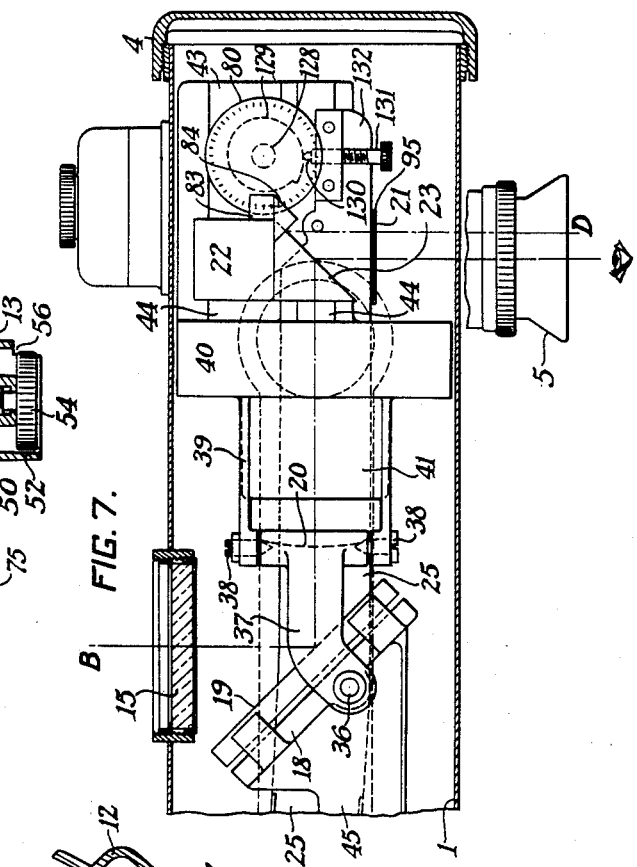
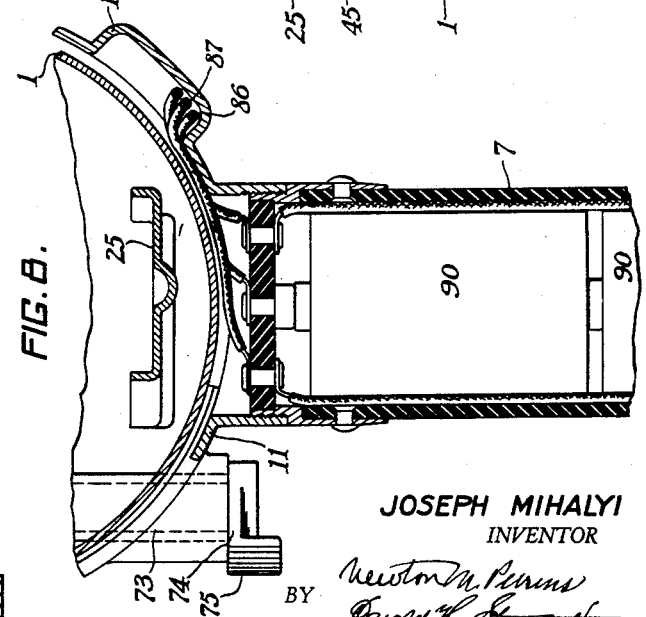
JOSEPH MIHALYI
INVENTOR
BY Newton N. Perins
Donald H. Stewart
ATTORNEYS July 9, 1946.    J. MIHALYI    2,403,738
RANGE FINDER CONSTRUCTION
Filed Oct. 10, 1942    3 Sheets-Sheet 3
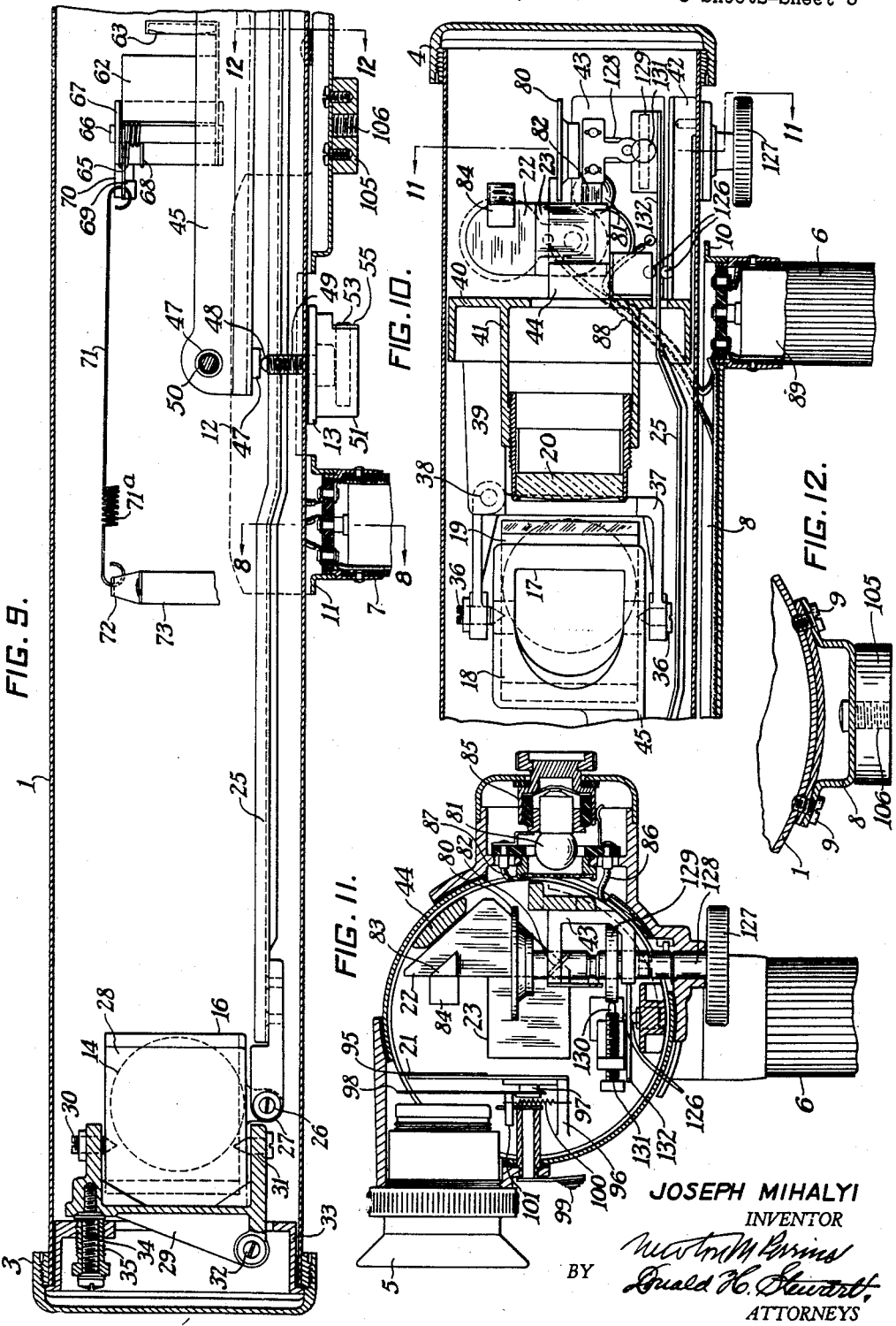
JOSEPH MIHALYI
INVENTOR
BY
ATTORNEYS Patented July 9, 1946

UNITED STATES PATENT OFFICE 2,403,738

RANGE FINDER CONSTRUCTION

Joseph Mihalyi, Rochester, N. Y., assignor to Eastman Kodak Company, Rochester, N. Y., a corporation of New Jersey Application October 10, 1942, Serial No. 461,585

17 Claims. (Cl. 88—2.7)

This invention relates to range finders and more particularly to a range finder construction which is simple, relatively inexpensive and accurate, and which construction permits a range finder to be held by hand by means of a pair of handles adjacent which various adjusting members are located. One object of my invention is to provide a range finder construction in which an operator may support a range finder for use solely by hand. Another object of my invention is to provide handles for carrying the range finder body so constructed that there is only a minimum chance that undue forces applied to the handle will distort the range finder body. Another object of my invention is to provide a hand held range finder so arranged that the operating members for the range finder can readily be moved by the hands of an operator supporting the range finder by its handles. Other objects will appear from the following specification, the novel features being particularly pointed out in the claims at the end thereof.

In the past one of the difficulties in providing a satisfactory and extremely accurate range finder has been that, if the range finder is made sufficiently heavy to prevent distortion, it is difficult to operate by holding manually so that in most instances range finders are mounted on tripods. Another difficulty with most range finders is that, if they are provided with handles for supporting the range finder and if they are made sufficiently light for convenient use, it has generally been possible to distort the body of the range finder by undue pressure upon the supporting handles, such as can readily take place when the user of the range finder is under fire. Another difficulty with known types of range finders is that the many adjusting members are sometimes difficult to operate unless the range finder is firmly supported as by a tripod. My present invention is directed particularly to overcoming these difficulties.

Coming now to the drawings wherein like reference characters denote like parts throughout:

Fig. 1 is a top plan view of a typical range finder constructed in accordance with and embodying my invention;

Fig. 2 is a fragmentary rear elevation of a portion of the range finder shown in Fig. 1;

Fig. 3 is a fragmentary detail section of a portion of an adjusting mechanism and taken on line 3—3 of Fig. 2;

Fig. 4 is a fragmentary section through a portion of one handle taken on line 4—4 of Fig. 2;

Fig. 5 is a wiring diagram of electrical equipment used in the range finder shown in Fig. 1;

Fig. 6 is an elongated fragmentary section through a portion of the range finder shown in Fig. 1 on a somewhat enlarged scale;

Fig. 7 is a fragmentary sectional view through the remainder of the range finder shown in Fig. 1 showing on an enlarged scale details of the range finder mechanism;

Fig. 8 is an enlarged fragmentary detail section taken on line 8—8 of Fig. 9;

Fig. 9 is a fragmentary sectional view on an enlarged scale similar to Fig. 6 but taken at right angles thereto;

Fig. 10 is an enlarged fragmentary detail similar to Fig. 7 but taken at right angles thereto;

Fig. 11 is an enlarged fragmentary section taken on line 11—11 of Fig. 10; and

Fig. 12 is a fragmentary sectional view on an enlarged scale taken on line 12—12 of Fig. 9.

My invention consists broadly in providing an extremely light and portable range finder construction in which the parts are so arranged that an operator can readily support a range finder at eye level by two handles. These handles are on a flexible type of support which permits limited movement of the handles without applying any torque to the body of the range finder itself and the various controlling adjustment members are arranged adjacent the handles so that they can be readily operated.

As indicated in Fig. 1, the range finder may consist of a casing 1, which in this instance is preferably made of light metal tubing, having end caps 3 and 4 and including an eyepiece 5 through which images may be made to coincide when the parts are brought into adjustment for a particular focal distance.

The elongated casing 1 may be supported by a pair of handles 6 and 7, these handles being carried by a bracket 8 of special construction. This bracket is made of flexible material, such as springy metal, and is preferably U-shaped or channel-shaped in cross-section as indicated in Fig. 12 which shows the point of connection between the bracket 8 and the elongated casing 1. In this instance it is attached to the casing by means of a pair of screws 9 which are arranged substantially midway between the ends 10 and 11 of the bracket which support the handles 6 and 7. In addition, as indicated in Fig. 10, the major portion of the bracket 8 is spaced away from the tubular casing 1 and is only in contact therewith at substantially the central portion thereof as indicated at Fig. 12. Thus, from Figs.

9 and 10, it will be noticed that the handles 6 and 7, which are carried by the ends 10 and 11 of the bracket, are spaced from the tubular casing and while this bracket does not extend straight along the lower portion of the casing 1, since it has an offset portion 12 extending about the adjusting support 13, it nevertheless is so arranged that movement of the handles 6 and 7 will distort only the spring bracket 8 and not the tubular body 1 of the range finder when unusual pressure is applied to these handles. As can readily be understood, when an operator is under fire he is liable to grasp the handles with considerable force and, with the construction above described, since the bracket 8 is attached to the casing 1 only by the two screws 9 and since it is spaced from the casing 1 throughout the remainder of its length, slight movement of the handles will not tend to distort the casing 1.

As is well known by those skilled in the art, extremely little force is sometimes all that is required to distort an optical instrument of this type in which a few thousandths of an inch distortion would spoil the accuracy of the instrument.

In the instrument described there are preferably a pair of windows 14 and 15, best shown in Figs. 6 and 7, through which light rays pass in measuring distances with this instrument. The spaced windows are centered on the axes A and B as shown in these figures. Light entering through the window 14 along the axis A may be reflected by a totally reflecting mirror 16 so as to pass down through the length of the cylindrical casing 1 and so as to pass through the window 17 in the mirror frame 18 as shown in Fig. 10. The mirror frame 18 supports a semi-transparent mirror 19, which not only passes light rays from the mirror 16, but also reflects light entering along the axis B through the window 15, so that an objective 20, shown in Fig. 10, may form an image of the two light beams at 21 after the light rays have been reflected by the prisms 22 and 23, these prisms reflecting the light rays in such a manner that the image will appear upright at the plane 21. This aerial image may then be viewed through the eyepiece 5 which contains suitable lenses to magnify the image.

In order to bring the two images into coincidence the mirror 16 may be moved by an arm 25 which extends through the casing and which is pivotally attached at 26 to a hinged member 27, best shown in Fig. 9, carrying a mirror bracket 28 which supports the mirror 16, this bracket being in turn pivoted to a U-shaped member 29 on the pivots 30 and 31. Member 29 is pivoted at 32 to the ring support 33 carried in the end of the range finder casing 1 and in setting up the instrument the screw 34 and the tubular screw 35 can be adjusted to move the bracket until an image of the collimated light coming through the window 14 is properly positioned. The arm 25 extends through the casing 1 and, as shown in Fig. 10, may be supported on ball bearings 126 which permit the arm to swing the mirror 16 about the pivots 30 and 31.

This swinging movement is accomplished by a knob 127 which is mounted on a shaft 128 to which a cam 129 is attached, this cam contacting with an end 130 on an adjusting screw 131 carried on the end 132 of the lever 25. Thus, when the knob 127 is turned, the cam will adjust the long lever 25 and with it the mirror 16.

It should be especially noted that the knob 127 is positioned adjacent handle 6 in a position in which it may be readily turned by the thumb to an operator's hand holding this handle or, if desired, by the forefinger of his hand. Thus, the knob may be readily operated while holding the handle 6.

The mirror bracket 18 which supports the semitransparent mirror 19 normally holds this mirror in a relatively fixed position. However, temperature changes, distortion of the instrument or other factors may move the mirror 19 from its true position, so that I have provided a means for moving this mirror to compensate for any distortion or improper position of the mirror. For full details of this adjustment reference may be had to my copending application Serial No. 461,584, filed October 10, 1942, Mount for optical element. As shown in this application the mirror 19 is carried by the frame 18 which is pivotally mounted by the pivots 36 which are carried by the U-shaped member 37 pivotally attached at 38 to the support 39 which forms part of a ring 40. This ring carries a tube 41 supporting the objective 20 and is attached at 42 to the tubular casing 1. The ring 40 likewise carries the support 43 for the cam 129 and the shaft 128 and the supporting member 44 for the prisms 22 and 23. The optical systems used in the range finder illustrated herein may be similar to the optical system of my copending cases Range finder, case B, Serial No. 472,832, filed January 19, 1943; Range finder, case F, Serial No. 479,096, filed March 13, 1943; Range finder, case G, Serial No. 479,097, filed March 13, 1943.

The frame 18 is carried by an arm 45, this arm extending part way through the casing and, as best shown in Fig. 3, terminating in two walls 46 arranged at right angles to each other, each wall having an accurately formed pad 47 contacting with the ends 48 of a pair of adjusting screws 49 and 50 which are arranged at right angles to each other and which have a threaded connection with a support 13. A sleeve 51 and 52 extends part way around the knurled surfaces 53 and 54 on these screws and these sleeves are provided with openings 55 and 56 through which the adjusting screws can be operated. A spring 57 attached to an ear 58 on the arm 25 and to a cap member 59 holds the arm against these two screws. Thus, if the aerial images formed by the objective 20 in the plane 21 of the eyepiece 5 should be offset vertically with respect to the instrument at eye level, the adjusting screw 53 can be turned swinging the mirror 19 about the pivot 38 correcting this mirror position until the images meet. If the images do not properly coincide at a given distance and are offset longitudinally of the instrument, the screw 54 may be turned until this is corrected. Since these adjustments need not often be made, the adjustment screws 53 and 54 are well protected, but they may nevertheless be turned by a thumb or forefinger of an operator's hand while still holding the handle 7.

It should be particularly noticed that the knobs 55 and 56 are adjacent the handle 7 and can readily be reached therefrom.

In the present instrument, which is particularly useful for spotting planes and for measuring their distance from the operator, I prefer to provide a means for giving a wide angle view for picking up the plane after which a much smaller angle of view is included during the operation of the range finder. Such mechanism may consist of the parts shown best in Figs. 9 and 6. From these figures it will be noticed that I have provided a negative lens 60 in a mount 61 in the wall of the casing 1 so that light rays may enter along the axis C and, when a mirror 62 is in the operative position shown, this mirror may reflect the light rays so that the lens 63, together with the objective 20, may form an image on the plane 21 giving a wide angle.

The mirror 62 and the lens 63 are mounted on a bracket 65 pivoted at 66 to a bracket 67 carried by the casing 1, there being a spring 68 always tending to move the bracket from a position in which the arm 69 is located by the stop 70 as indicated in Fig. 6. A wire 71 leads from the bracket 65 to a lever 72. I preferably provide a spring 71a between the brackets 65 and the lever 72 to take up for lost motion. The lever 72 is carried by an arm 73 which passes through the tubular casing 1 and terminates in an arm 74 having a roughened operating surface 75. This arm with its roughened surface 75, as indicated in Fig. 2, lies adjacent the handle 7 and can readily be operated therefrom. In the position shown in Figs. 6 and 9 an operator would observe the wide angle view through the eyepiece 5. As soon as a plane is sighted and brought to the center of this wide angle view, the operator then releases the arm 75 permitting the spring 68 to swing the bracket 65 from its operative position to an inoperative position in which the stop 76 contacts with a stop 77 and in which the mirror 62 and lens 63 are swung out of the path of light rays passing into the casing along the axis A through the window 14 and reflected by the mirror 16. The operator then turns the knob 127 until the two images are brought into registration at which time the distance of the object can be read through the eyepiece 5 in the following manner.

The shaft 128 (Fig. 11) carries a light transmitting disk 80 which may be illuminated by a light from a lamp 81 reflected upwardly by a mirror 82 so that graduations on the transparent or translucent disk 80 may be read, since these graduations are reflected by the prisms 83 and 84, the latter of which provides an image of the graduations in front of the eyepiece 5.

The lamp 81 is mounted in a suitable socket 85 and is connected to the wires 86 and 87 which pass through an arcuate slot 88 in the ring-like member 40 and out through an opening into the channel-shaped spring handle support 8. These wires are connected to batteries 89 and 90 carried in the hollow handles 6 and 7 and Fig. 5 indicates a diagram of the wiring system in which the batteries 89 and 90 are connected in series with the wires 86 and 87, there being a switch member 91 for energizing the lamp 81. As best shown in Fig. 2 this switch member 91 is also readily accessible from the handle 6 and is in the present instance mounted on the handle. A rheostat 92 is mounted on the handle 7 so that the brilliance of the lamp 81 can be determined by turning the rheostat 92, this operation being readily accomplished while holding the handle 7.

From the above description it will be noted that the entire range finder casing 1 may be manually supported by the handles 6 and 7, these handles being carried on the extreme ends of a spring bracket 8 which is attached to the range finder casing 1 only at a point intermediate the handles so that, if the handles should be moved a slight distance toward or from each other in holding the instrument, only the bracket 8 will spring and there will be no tendency to distort the light tubular casing 1.

The aerial image formed by the lens 20 on the plane 21 may be viewed through the eyepiece 5 and there is also located at this plane a sheet of transparent material, such as glass or plastic, 95 bearing a reticle which may be marked or engraved with crosshairs or other means for centering the images. This material is carried by a bracket 96 which also supports a pivot 97 carrying a filter 98 which may be moved to and from an operative position in front of the eyepiece as shown in Fig. 11 by means of a lever 99 which lies beneath the eyepiece 5 and also adjacent the handle 6, so that it may be operated therefrom. A spring 100 may be attached to a pin 101 carried by the filter 98 so as to swing past a dead center with respect to the pivot 97 to hold the filter in either an operative or an inoperative position.

I have provided a means for mounting the range finder on a tripod if this should be desired. This means, as indicated in Figs. 2 and 12, consists of a disk member 105 attached to the spring channel member 8, the disk member being provided with a thread 106 which can be attached to a tripod screw. However, this equipment is primarily intended for use while supported by hand.

It should also be noticed that all of the members which must be operated to operate or adjust the range finder are located either on or adjacent to the handles 6 and 7 so that all of these members can be operated without removing the hands from the two handles. It is therefore a simple matter for an operator to hold the range finder casing at eye level while looking through the eyepiece 5. In order to more readily pick up a plane, he may desire to press the handle 75 which throws the wide angle viewing device into its operative position shown in Fig. 6. After centering the image the handle 75 may be released so that a narrow angle view of the plane will appear in two images which he can readily register by turning the thumb screw 27 to adjust the angle of the mirror 16 relative to that of the semi-transparent mirror 19 so that the two images may be made to register or coincide on the plane 21. When the images so register, the operator will then press the switch 91 carried by handle 6 causing the lamp 81 to illuminate the disk 80 so that the distance may be directly read from this disk while still looking through the eyepiece 5. Thus the lamp is only used momentarily for reading the range.

The other adjusting members, such as the adjusting screws 49 and 50, the filter handle 99 and the rheostat 92 can also be moved when necessary without releasing the handles 6 and 7. However, after the adjusting screws 49 and 50 are once set and the rheostat 92 is adjusted to give a desired lamp brilliance, it is not necessary to use these adjustments except at infrequent intervals. The filter handle 99 may be used somewhat more often, but even this handle is not operated as frequently as are the main adjusting members, that is the wide angle view handle 75, the focusing knob 27, and the light switch 91 for reading the focal setting of the instrument.

From the above description it will be noticed that the construction of my range finder is such that it may be made of light material and there will be but little chance of accidentally distorting the casing a sufficient distance to interfere with the accuracy of the optical element contained therein.

What I claim is:

1. In a range finder, the combination with an elongated casing including optical parts of which some are adjustable for range finding, of handles for supporting the casing and means for resiliently attaching the handles to the casing whereby pressure applied to the handles may be at least partially absorbed by the resilient attaching means and the tendency to distort said elongated casing may be reduced to a minimum.

2. In a range finder, the combination with an elongated casing including optical parts of which some are adjustable for range finding, of handles for supporting the casing and means for resiliently attaching the handles to the casing comprising a spring bracket, a handle attached to each end of the bracket, said bracket including means for attaching said bracket to the elongated casing spaced away from said handles.

3. In a range finder, the combination with an elongated casing including optical parts of which some are adjustable for range finding, of handles for supporting the casing and means for resiliently attaching the handles to the casing comprising a spring bracket carrying the handles at each end thereof, and means at substantially the center of the bracket for attaching the bracket to the elongated casing, whereby the handles may be moved relative to the casing.

4. In a range finder, the combination with an elongated casing including optical parts of which some are adjustable for range finding, of handles for supporting the casing and means for resiliently attaching the handles to the casing comprising a spring bracket attached to the casing midway between the handles, the bracket being spaced throughout the greater part of its length from the casing and being free to flex from the fastening toward the ends thereof.

5. In a range finder of the type including a tubular casing containing optical elements for range finding and a lamp, a pair of spaced hollow handles for supporting the casing, flexible means for connecting the handles to the tubular casing, batteries in the hollow handles and wires leading from said handles and batteries to the lamp, and a switch carried by one handle positioned for operation while supporting the range finder by the handles.

6. In a range finder of the type including a tubular casing containing optical elements for range finding and a lamp, a pair of spaced hollow handles for supporting the casing, flexible means for connecting the handles to the tubular casing, batteries in the hollow handles and wires leading from said handles and batteries to the lamp, a rheostat carried by one handle, and a switch carried by the other handle, both the rheostat and switch being in a circuit including said wires and lamp inside the tubular casing.

7. In a range finder of the type including a tubular casing containing optical elements for range finding and a lamp, a pair of spaced hollow handles for supporting the casing, flexible means for connecting the handles to the tubular casing, batteries in the hollow handles and wires leading from said handles and batteries to the lamp, and a switch carried by one handle positioned for operation while supporting the range finder by the handles, the means for connecting the handles to the tubular casing including a flexible channel member also carrying and substantially enclosing said wires.

8. In a range finder of the type including a tubular casing containing optical elements for range finding and a lamp, a pair of spaced hollow handles for supporting the casing, flexible means for connecting the handles to the tubular casing, batteries in the hollow handles and wires leading from said handles and batteries to the lamp, and a switch carried by one handle positioned for operation while supporting the range finder by the handles, the means for connecting the handles to the tubular casing including a flexible channel member also carrying and substantially enclosing said wires, the channel member extending longitudinally of the tubular casing and being attached thereto at one point only.

9. In a range finder of the type including a tubular casing containing optical elements for range finding and a lamp, a pair of spaced hollow handles for supporting the casing, flexible means for connecting the handles to the tubular casing, batteries in the hollow handles and wires leading from said handles and batteries to the lamp, and a switch carried by one handle positioned for operation while supporting the range finder by the handles, the means for connecting the handles to the tubular casing including a flexible channel member also carrying and substantially enclosing said wires, the flexible channel member being of a shape to be normally spaced from the tubular casing except at the point where it is fastened thereto.

10. In a range finder of the type including a tubular casing containing optical range finding elements one of which is movable, the combination with a pair of spaced handles for manually supporting the range finder tubular casing, means for deflecting the movable range finding element including a shaft extending through the tubular casing, and means on the shaft for turning the shaft positioned adjacent the handle to be operated by an operator holding said handle, and means between the handle and the tubular body whereby said handle may move relatively thereto and relatively to the means for turning the shaft.

11. In a range finder of the type including a tubular casing containing optical range finding elements one of which is movable, the combination with a pair of spaced handles for manually supporting the range finder tubular casing, means for deflecting the movable range finding element including a pair of shafts angularly arranged and extending through the tubular casing and positioned adjacent a handle, each shaft including a knob operable from the handle for adjusting the movable range finding element.

12. In a range finder of the type including a tubular casing containing optical range finding elements one of which is movable, the combination with a pair of spaced handles for manually supporting the range finder tubular casing, means for deflecting the movable range finding element including a pair of shafts angularly arranged and extending through the tubular casing and positioned adjacent a handle, each shaft including a knob operable from the handle for adjusting the movable range finding element, and guards partially enclosing said knobs to protect said knobs against accidental displacement, each guard including an opening for operating the knob from the handle.

13. In a range finder of the type including an elongated casing containing optical range finding elements and including a light tubular member, handles for manually supporting said tubular member, a bracket carrying both handles, said bracket being attached to the tubular member solely by a fastening member substantially equally spaced between the handles, said bracket comprising a flexible metal strip normally lying adjacent to but spaced from the tubular member throughout the greater part of its length.

14. In a range finder of the type including an elongated casing containing optical range finding elements and including a light tubular member, handles for manually supporting said tubular member, a bracket carrying both handles, said bracket being attached to the tubular member solely by a fastening member substantially equally spaced between the handles, said bracket comprising a flexible metal strip normally lying adjacent to but spaced from the tubular member throughout the greater part of its length, said fastening member for holding the bracket on the tubular member including a threaded opening for supporting the tubular member from a suitable tripod attached thereto.

15. A range finder of the type including a casing containing range finder elements, a supplementary view finder adapted to cooperate with certain range finder elements, a hinged mirror forming a part of the view finder, a spring normally holding the mirror in an inoperative position, a pair of spaced handles supported by the casing, a lever adjacent one of the handles on the outside of the casing, a shaft passing through the casing and means connecting the shaft and mirror for moving the mirror to an operative position against the pressure of its spring, said lever being adjacent one of the handles and accessible from the handle, whereby the range finder may be simultaneously held and operated by said handle and adjacent lever.

16. A range finder of the type including a casing having a plurality of range finder elements including a plurality of movably mounted elements mounted therein, a pair of spaced handles resiliently carried by the casing for supporting the range finder, a plurality of range finder element controls for moving the movable range finder elements, said controls extending from the inside to the outside of the casing where they are located adjacent said handles in position to be operated by the hands of an operator holding said handles.

17. A range finder of the type including a casing having a plurality of range finder elements including a plurality of movably mounted elements mounted therein, a pair of spaced handles resiliently carried by the casing for supporting the range finder, a plurality of range finder element controls for moving the movable range finder elements, said controls extending from the inside to the outside of the casing and terminating in movable members, said movable members being located to move through fixed paths adjacent said resiliently mounted handles and positioned to be moved by the hands of an operator grasping said handles whereby a minimum tendency to distort the casing may occur from stress applied to the handles by an operator.

JOSEPH MIHALYI.